(12) United States Patent
Tagawa et al.

(10) Patent No.: US 11,026,437 B2
(45) Date of Patent: Jun. 8, 2021

(54) GAS SUPPLY DEVICE, INTERIOR AIR ADJUSTMENT DEVICE, AND CONTAINER REFRIGERATION DEVICE

(71) Applicant: DAIKIN INDUSTRIES, LTD., Osaka (JP)

(72) Inventors: Hirotaka Tagawa, Osaka (JP); Makoto Ikemiya, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 0 days.

(21) Appl. No.: 16/646,042

(22) PCT Filed: Sep. 19, 2018

(86) PCT No.: PCT/JP2018/034659
§ 371 (c)(1),
(2) Date: Mar. 10, 2020

(87) PCT Pub. No.: WO2019/059232
PCT Pub. Date: Mar. 28, 2019

(65) Prior Publication Data
US 2020/0260749 A1   Aug. 20, 2020

(30) Foreign Application Priority Data

Sep. 19, 2017 (JP) .............................. JP2017-179017

(51) Int. Cl.
| A23B 7/148 | (2006.01) |
| A23B 7/04 | (2006.01) |
| B01D 46/42 | (2006.01) |
| B01D 46/44 | (2006.01) |
| F25D 17/04 | (2006.01) |
| F25D 31/00 | (2006.01) |

(52) U.S. Cl.
CPC ............... *A23B 7/148* (2013.01); *A23B 7/04* (2013.01); *B01D 46/4263* (2013.01);
(Continued)

(58) Field of Classification Search
CPC ...... A23B 7/04; A23B 7/148; A23V 2002/00; B01D 46/00; B01D 46/4263;
(Continued)

(56) References Cited

U.S. PATENT DOCUMENTS 3,977,847 A * 8/1976 Clark ................. B01D 46/0067
95/279
5,438,841 A    8/1995 Cahill-O'Brien et al.
(Continued)

FOREIGN PATENT DOCUMENTS

EP    0692199 A2    1/1996
JP    1-168209 A    7/1989
(Continued)

OTHER PUBLICATIONS

International Search Report, issued in PCT/JP2018/034659, dated Dec. 11, 2018.

*Primary Examiner* — Edward F Landrum
*Assistant Examiner* — Chang H Park
(74) *Attorney, Agent, or Firm* — Birch, Stewart, Kolasch & Birch, LLP

(57) ABSTRACT

A gas supply device is provided with a heating unit that heats gas flowing into a filter provided in a filter unit.

8 Claims, 9 Drawing Sheets

(52) U.S. Cl.
CPC ......... *B01D 46/442* (2013.01); *F25D 17/042* (2013.01); *F25D 31/005* (2013.01); *A23V 2002/00* (2013.01)

(58) Field of Classification Search
CPC ... B01D 46/442; F25D 11/003; F25D 17/042; F25D 2317/041; F25D 2400/02; F25D 31/005
USPC .......................................................... 340/607
See application file for complete search history.

(56) References Cited

U.S. PATENT DOCUMENTS

| | | | |
|---|---|---|---|
| 6,092,430 A | 7/2000 | Liston et al. | |
| 10,136,657 B2 * | 11/2018 | Kamei | ................... B01D 69/02 |
| 2017/0001137 A1 * | 1/2017 | Lans | ................... B01D 46/008 |
| 2018/0213808 A1 | 8/2018 | Kamei et al. | |
| 2018/0245835 A1 | 8/2018 | Kamei et al. | |

FOREIGN PATENT DOCUMENTS

| | | | | |
|---|---|---|---|---|
| JP | 1-127475 U | | 8/1989 | |
| JP | 3-117480 U | | 12/1991 | |
| JP | 5-76276 A | | 3/1993 | |
| JP | 5-115152 A | | 5/1993 | |
| JP | 8-166 A | | 1/1996 | |
| JP | 2016-164487 A | | 9/2016 | |
| JP | 2017-44445 A | | 3/2017 | |
| JP | 2017044445 A | * | 3/2017 | ............. F25D 23/00 |

* cited by examiner

GAS SUPPLY DEVICE, INTERIOR AIR ADJUSTMENT DEVICE, AND CONTAINER REFRIGERATION DEVICE

TECHNICAL FIELD

The present disclosure relates to a gas supply device including a filter unit and an air pump in a gas passage through which air is supplied to a target space, an interior air adjustment device that supplies, to the target space, mixed gas generated by the gas supply device and having a high nitrogen concentration and a low oxygen concentration, and a container refrigeration device including the interior air adjustment device.

BACKGROUND ART

Conventionally, a container refrigeration device including a refrigerant circuit that performs a refrigeration cycle has been used in order to cool air inside a container used for maritime transport or the like (see, for example, Patent Literature 1). For example, plants such as bananas and avocados are loaded in the container. Even after being harvested, plants breathe by taking in oxygen in the air and releasing carbon dioxide. When the plants breathe, the nutrients and moisture stored in the plants are reduced, making the plants less fresh. Therefore, the interior of the container preferably has a reasonably low oxygen concentration at which a respiratory problem does not arise.

For that purpose, Patent Literature 1 discloses the following interior air adjustment device. This interior air adjustment device uses an adsorbent that adsorbs, when pressurized, nitrogen components in the air in order to generate nitrogen-enriched air (mixed gas) having a higher nitrogen concentration and a lower oxygen concentration than air. The interior air adjustment device then supplies the nitrogen-enriched air to the interior of a container to thereby lower the oxygen concentration of the interior space and reduce the respiration rate of plants, making it easy to keep the plants fresh. The interior air adjustment device generates the nitrogen-enriched air through an adsorption operation and a subsequent desorption operation. In the adsorption operation, pressurized air is sent by an air pump into an adsorption cylinder containing an adsorbent, and the adsorbent adsorbs nitrogen components. In the desorption operation, the air pump sucks air from the adsorption cylinder to desorb the nitrogen components adsorbed on the adsorbent.

Components of the interior air adjustment device are stored in a unit case having a sealed structure. The interior air adjustment device configured as one unit is attached in a space outside a container refrigeration device. A filter unit provided in an air intake port is installed separately from the interior air adjustment device and connected to the interior air adjustment device by an air hose. The filter unit is provided with a filter, and the filter is covered with a sheet metal cover to avoid direct contact with water.

CITATION LIST

Patent Literature

[Patent Literature 1] JP 2017-044445 A

SUMMARY OF THE INVENTION

Technical Problem

Note that sea salt particles adhere to a filter of a device, such as the above interior air adjustment device, used under conditions where the device may suffer from salt damage. When the humidity becomes high, therefore, a water film is formed on the filter due to a deliquescence phenomenon. As a result, the ventilation resistance or pressure loss of the filter may increase, making it difficult for air to pass through the filter during operation. However, this conventional technology cannot prevent the increase in pressure loss and the difficulty of air passing through the filter during operation.

This problem may arise not only in the interior air adjustment device of a container refrigeration device installed in a marine container, but also in a gas supply device having components such as pumps and valves, which need to be resistant to salt damage, in order to send gas such as air through a filter into, for example, a warehouse constructed in a coastal area.

An object of the present disclosure is to prevent a phenomenon in which it becomes difficult for air to pass through a filter of a gas supply device due to an increase in pressure loss of the filter caused by deliquescence.

Solution to Problem

A first aspect of the present disclosure is based on a gas supply device including a gas passage (40) through which gas is supplied to a target space, a filter unit (75) provided at an inlet of the gas passage (40), and an air pump (31) provided on the gas passage (40).

This gas supply device includes a heating unit (93) that heats gas flowing into a filter (76) provided in the filter unit (75).

In the first aspect, the occurrence of a deliquescence phenomenon is suppressed by heating of the filter (76), making it possible to prevent the difficulty of gas passing through the filter (76) during operation.

A second aspect is an aspect according to the first aspect, further including a salt amount detection unit (91) that detects an amount of salt adhering to the filter (76) provided in the filter unit (75), and a humidity detection unit (92) that detects a relative humidity of gas flowing into the gas passage (40) from the inlet.

A third aspect is an aspect according to the second aspect, wherein the heating unit (93) is configured to heat the gas flowing into the filter (76) in a case where the amount of salt detected by the salt amount detection unit (91) is equal to or higher than a reference salt amount and the relative humidity of the gas detected by the humidity detection unit (92) is equal to or higher than a humidity reference value.

In the second and third aspects, the gas flowing into the filter (76) is heated by the heating unit (93) in the case where the amount of salt detected by the salt amount detection unit (91) is equal to or higher than the reference salt amount and the relative humidity of the gas detected by the humidity detection unit (92) is equal to or higher than the humidity reference value. Therefore, even under a condition where the humidity is high and deliquescence is likely to occur, the occurrence of the deliquescence phenomenon is suppressed, making it possible to prevent the difficulty of gas passing through the filter (76) during operation.

For example, the reference salt amount and the humidity reference value may be set to such values that the deliquescence phenomenon immediately occurs upon detection of these values, or may be set to a slightly low value, that is, a value at which the deliquescence phenomenon occurs due to an increase in humidity and the pressure loss is predicted to increase. If lower values are set, the gas flowing into the filter (76) is heated in advance before the deliquescence phenomenon occurs.

A fourth aspect is based on an interior air adjustment device including a gas supply device (30), and a mixed gas generator (38) that generates, from air taken in through a filter unit (75) of the gas supply device (30), mixed gas having a higher nitrogen concentration and a lower oxygen concentration than the air.

In this interior air adjustment device, the gas supply device (30) is the gas supply device (30) according to any one of the first to third aspects, and the interior air adjustment device is configured to supply the gas generated by the mixed gas generator (38) to the target space using the air pump (31).

In the interior air adjustment device of the fourth aspect, even under the condition where the humidity is high and deliquescence is likely to occur, the occurrence of the deliquescence phenomenon is suppressed, making it possible to prevent the difficulty of air passing through the filter (76) during operation.

A fifth aspect is based on a container refrigeration device including a casing (12) mounted on a container (11), a component, of a refrigerant circuit (20), attached to the casing (12), and an interior air adjustment device (60) attached to the casing (12), the container refrigeration device being configured to cool an interior space of the container (11) and to supply mixed gas to the interior space of the container (11) by the interior air adjustment device.

In this container refrigeration device, the interior air adjustment device (60) is the interior air adjustment device (60) according to the fourth aspect.

In the container refrigeration device of the fifth aspect, even under the condition where the humidity is high and deliquescence is likely to occur, the occurrence of the deliquescence phenomenon is suppressed, making it possible to prevent the difficulty of air passing through the filter (76) during operation.

A sixth aspect is an aspect according to the fifth aspect, wherein the heating unit (93) is configured to heat the gas using air that has passed through a condenser (22) provided in the refrigerant circuit (20).

In the sixth aspect, even under the condition where the humidity is high and deliquescence is likely to occur since the gas flowing into the filter (76) is heated by the air that has passed through the condenser (22), the occurrence of the deliquescence phenomenon is suppressed. It is possible to prevent the difficulty of gas passing through the filter (76) during operation Advantageous Effects of Invention According to the first aspect, since the gas flowing into the filter (76) is heated by the heating unit (93), moisture is released from the filter (76) and the occurrence of the deliquescence phenomenon is suppressed. Therefore, according to the first aspect, it is possible to prevent the difficulty of air passing through the filter (76) during operation.

According to the second and third aspects, the gas flowing into the filter (76) is heated by the heating unit (93) in the case where the amount of salt detected by the salt amount detection unit (91) is equal to or higher than the reference salt amount and the relative humidity of the gas detected by the humidity detection unit (92) is equal to or higher than the humidity reference value. Therefore, under the condition where the humidity is high and deliquescence is likely to occur, moisture is released from the filter (76), and the occurrence of the deliquescence phenomenon is suppressed. That is, according to the second and third aspects, it is possible to prevent the difficulty of air passing through the filter (76) during operation. If the reference salt amount and the humidity reference value are set low, the gas can be heated when the deliquescence phenomenon is predicted to occur with an increase in humidity, making it possible to prevent an increase in pressure loss.

According to the fourth aspect, in the interior air adjustment device (60), it is possible to prevent the difficulty of air passing through the filter (76) during operation.

According to the fifth aspect, in the container refrigeration device, it is possible to prevent the difficulty of air passing through the filter (76) during operation.

According to the sixth aspect, the gas flowing into the filter (76) is heated by the condenser (22) of the refrigerant circuit (20), making it possible to prevent, with a simple configuration, the difficulty of the gas passing through the filter (76) during operation.

DESCRIPTION OF EMBODIMENTS

An embodiment will be described in detail below with reference to the drawings. The present embodiment relates to a container refrigeration device provided with an interior air adjustment device including a gas supply device of the present disclosure. Note that the following description of the preferred embodiment is merely illustrative in nature and is not intended to limit the present disclosure, applications of the disclosure, or use of the disclosure.

Figure 1:
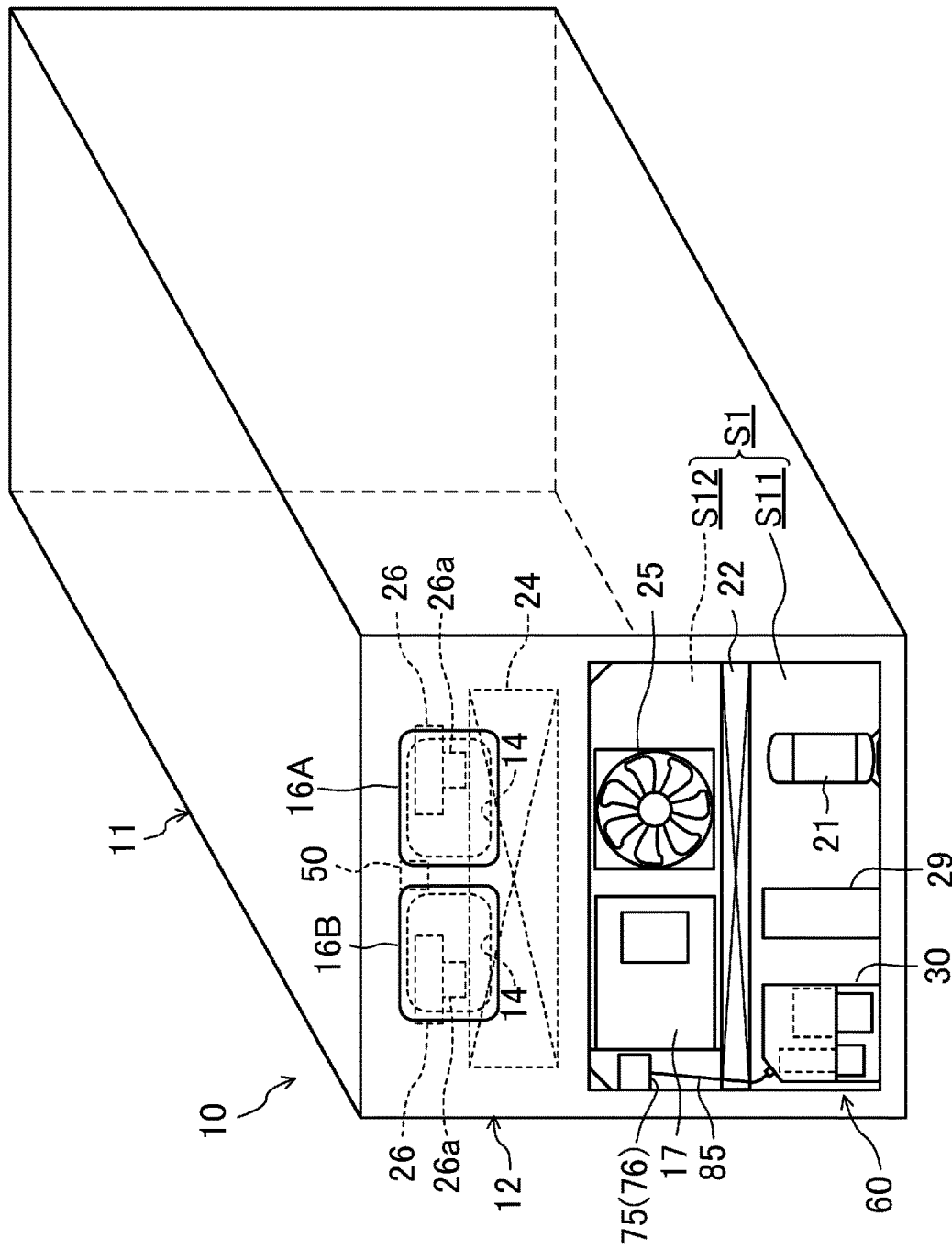
FIG. 1 is a perspective view of a container refrigeration device according to an embodiment as viewed from the outside.
Figure 2:
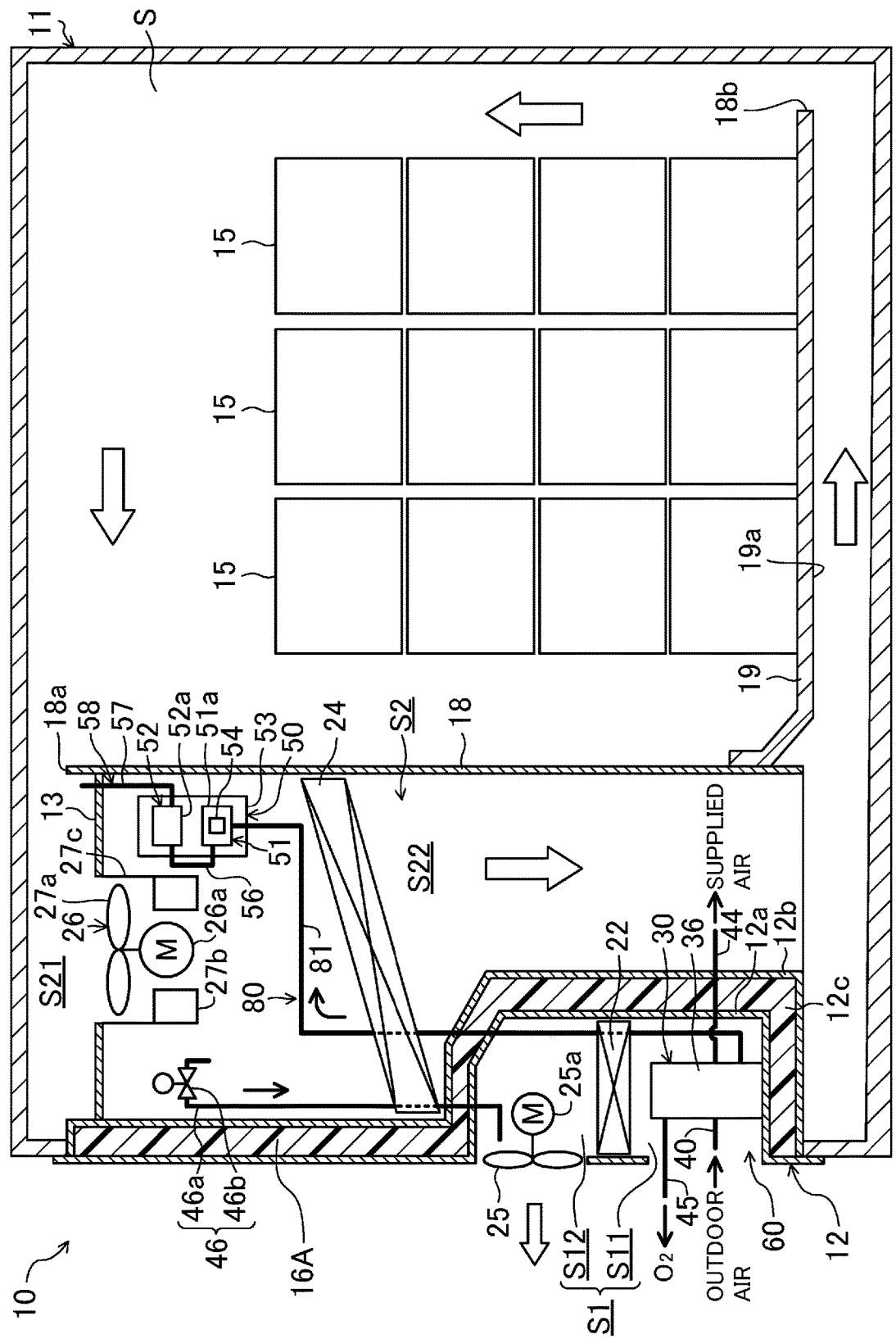
FIG. 2 is a side sectional view illustrating a schematic configuration of the container refrigeration device.

As illustrated in FIGS. 1 and 2, a container refrigeration device (10) is provided in a container (11) used for maritime transport and the like, and cools interior air of the container (11). Plants (15) are stored in boxes in an interior space (target space) (S) of the container (11). The plants (15) breathe by taking in oxygen ($O_2$) in the air and releasing carbon dioxide ($CO_2$). Examples of the plants include fruits such as bananas and avocados, vegetables, grains, bulbs, and fresh flowers.

The container (11) is formed in an elongated box shape with one end face opened. The container refrigeration device (10) includes a casing (12), a refrigerant circuit (20), and a CA device (interior air adjustment device/controlled atmosphere system) (60), and is attached to the container (11) so as to close the open end of the container (11).

Casing

As illustrated in FIG. 2, the casing (12) includes an outer wall (12a) located on the outer side of the container (11), and an inner wall (12b) located on the inner side of the container (11). The outer wall (12a) and the inner wall (12b) are made of, for example, an aluminum alloy.

The outer wall (12a) is attached to a peripheral edge of the opening of the container (11) so as to close the open end of the container (11). The outer wall (12a) is formed with a lower part thereof bulging toward the interior of the container (11).

The inner wall (12b) is disposed while facing the outer wall (12a). The inner wall (12b) bulges toward the interior in a manner corresponding to the lower part of the outer wall (12a). A heat insulating material (12c) is provided in a space between the inner wall (12b) and the outer wall (12a).

As described above, the lower part of the casing (12) is formed while bulging toward the interior of the container (11). As a result, an outer storage space (S1) is formed outside the container (11) at the lower part of the casing (12), and an inner storage space (S2) is formed inside the container (11) at an upper part of the casing (12).

As illustrated in FIG. 1, two service openings (14) for maintenance are formed in the casing (12) side by side in the width direction. The two service openings (14) are closed by first and second service doors (16A, 16B) that can be opened and closed. Like the casing (12), the first and second service doors (16A, 16B) each include an outer wall, an inner wall, and a heat insulating material.

As illustrated in FIG. 2, a partition plate (18) is disposed inside the container (11). The partition plate (18) is configured as a substantially rectangular plate member, and is erected while facing a surface of the casing (12) on the inner side of the container (11). The partition plate (18) separates the interior space (S) and the inner storage space (S2) of the container (11).

A suction port (18a) is formed between an upper end of the partition plate (18) and a ceiling surface in the container (11). The interior air of the container (11) is taken into the inner storage space (S2) through the suction port (18a).

A section wall (13) extending in the horizontal direction is provided in the inner storage space (S2). The section wall (13) is attached to an upper end portion of the partition plate (18). An opening, in which an inner fan (26) to be described later is installed, is formed in the section wall (13). The section wall (13) separates the inner storage space (S2) into a primary space (S21) on the suction side of the inner fan (26) and a secondary space (S22) on the blow-out side of the inner fan (26). In the present embodiment, the inner storage space (S2) is separated vertically by the section wall (13) into the upper primary space (S21) on the suction side and the lower secondary space (S22) on the blow-out side.

A floor plate (19) is provided in the container (11) with a gap between a bottom surface of the container (11) and the floor plate (19). The boxed plants (15) are placed on the floor plate (19). An underfloor channel (19a) is formed between the bottom surface in the container (11) and the floor plate (19). A gap communicating with the underfloor channel (19a) is provided between a lower end of the partition plate (18) and the bottom surface in the container (11).

A blow-out port (18b) is formed in the floor plate (19) at the back side (right side in FIG. 2) of the container (11). Air that has been cooled by the container refrigeration device (10) is blown into the interior space (S) of the container (11) through the blow-out port (18b).

Configuration and Arrangement of Refrigerant Circuit and the Like

Figure 3:
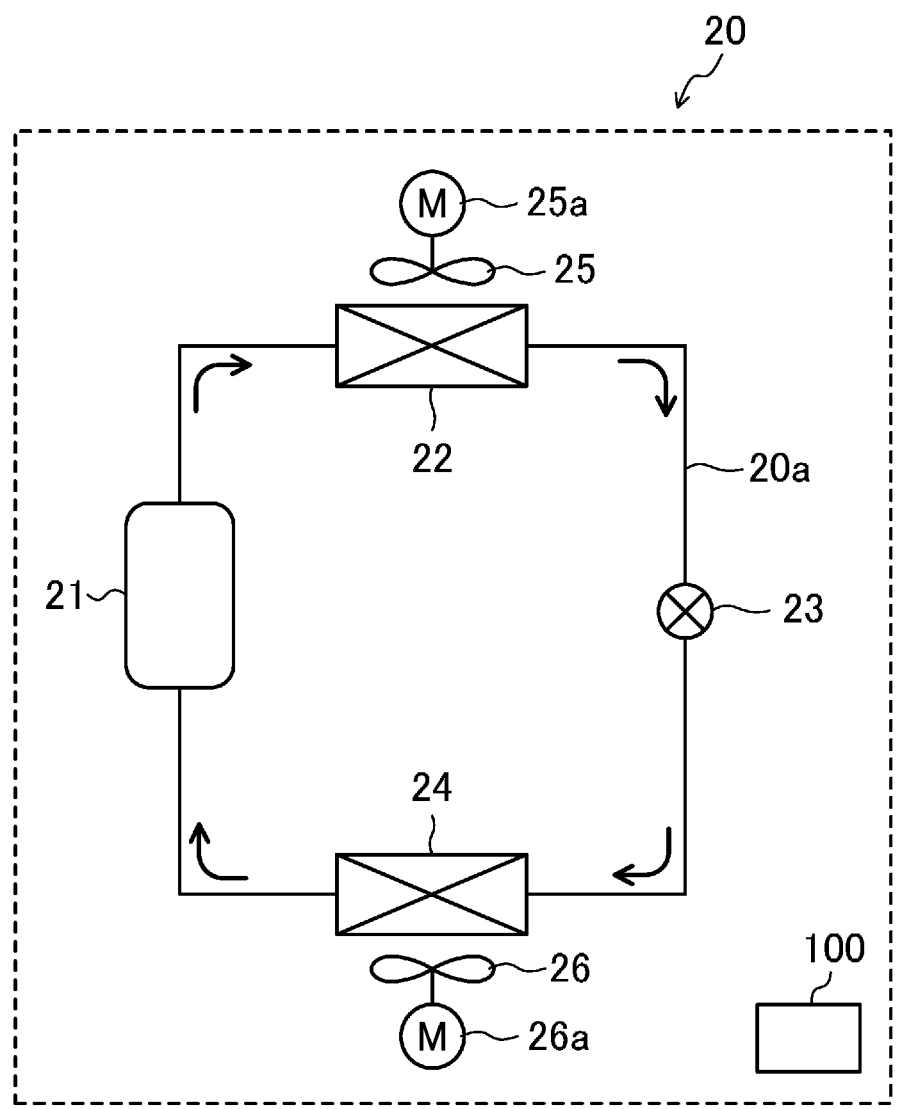
FIG. 3 is a piping system diagram illustrating a configuration of a refrigerant circuit of the container refrigeration device.

As illustrated in FIG. 3, the refrigerant circuit (20) is a closed circuit configured by connecting a compressor (21), a condenser (22), an expansion valve (23), and an evaporator (24) in that order by a refrigerant pipe (20a).

An outer fan (25) is provided near the condenser (22). The outer fan (25) is driven to rotate by an outer fan motor (25a), and guides the air outside the container (11) (outdoor air) into the outer storage space (S1) and to the condenser (22). In the condenser (22), heat is exchanged between refrigerant pressurized by the compressor (21) and flowing through the condenser (22) and the outdoor air guided to the condenser (22) by the outer fan (25). In the present embodiment, the outer fan (25) includes a propeller fan.

Two inner fans (26) are provided near the evaporator (24). The inner fans (26) are driven to rotate by an inner fan motor (26a), and guide the interior air of the container (11) from the suction port (18a) and blow the air onto the evaporator (24). In the evaporator (24), heat is exchanged between the refrigerant decompressed by the expansion valve (23) and flowing through the evaporator (24) and the interior air guided to the evaporator (24) by the inner fan (26).

As illustrated in FIG. 2, the inner fan (26) includes a propeller fan (rotary blade) (27a), a plurality of stationary blades (27b), and a fan housing (27c). The propeller fan (27a) is coupled to the inner fan motor (26a), is driven to rotate around the rotation axis by the inner fan motor (26a), and blows air in the axial direction. The plurality of stationary blades (27b) is provided on the blow-out side of the propeller fan (27a) and straightens the flow of air swirling after being blown from the propeller fan (27a). The fan housing (27c) includes a cylindrical member having an inner peripheral surface to which the plurality of stationary blades (27b) is attached. The fan housing (27c) extends to and surrounds the outer periphery of the propeller fan (27a).

As illustrated in FIG. 1, the compressor (21) and the condenser (22) are stored in the outer storage space (S1). The condenser (22) is provided at a vertically central portion of the outer storage space (S1) while separating the outer storage space (S1) into a lower first space (S11) and an upper second space (S12). The compressor (21), an inverter box (29) in which a drive circuit for driving the compressor (21) at a variable speed is stored, and a gas supply device (30) of the CA device (60) are provided in the first space (S11). Meanwhile, the outer fan (25) and an electric component box (17) are provided in the second space (S12). The first space (S11) is open to the space outside the container (11), while the second space (S12) is partially closed off from the outside space by a plate-shaped member such that only the blow-out port of the outer fan (25) opens to the outside space.

Meanwhile, as illustrated in FIG. 2, the evaporator (24) is stored in the secondary space (S22) of the inner storage space (S2). The two inner fans (26) are provided above the evaporator (24) in the inner storage space (S2), side by side in the width direction of the casing (12).

CA Device

Figure 4:
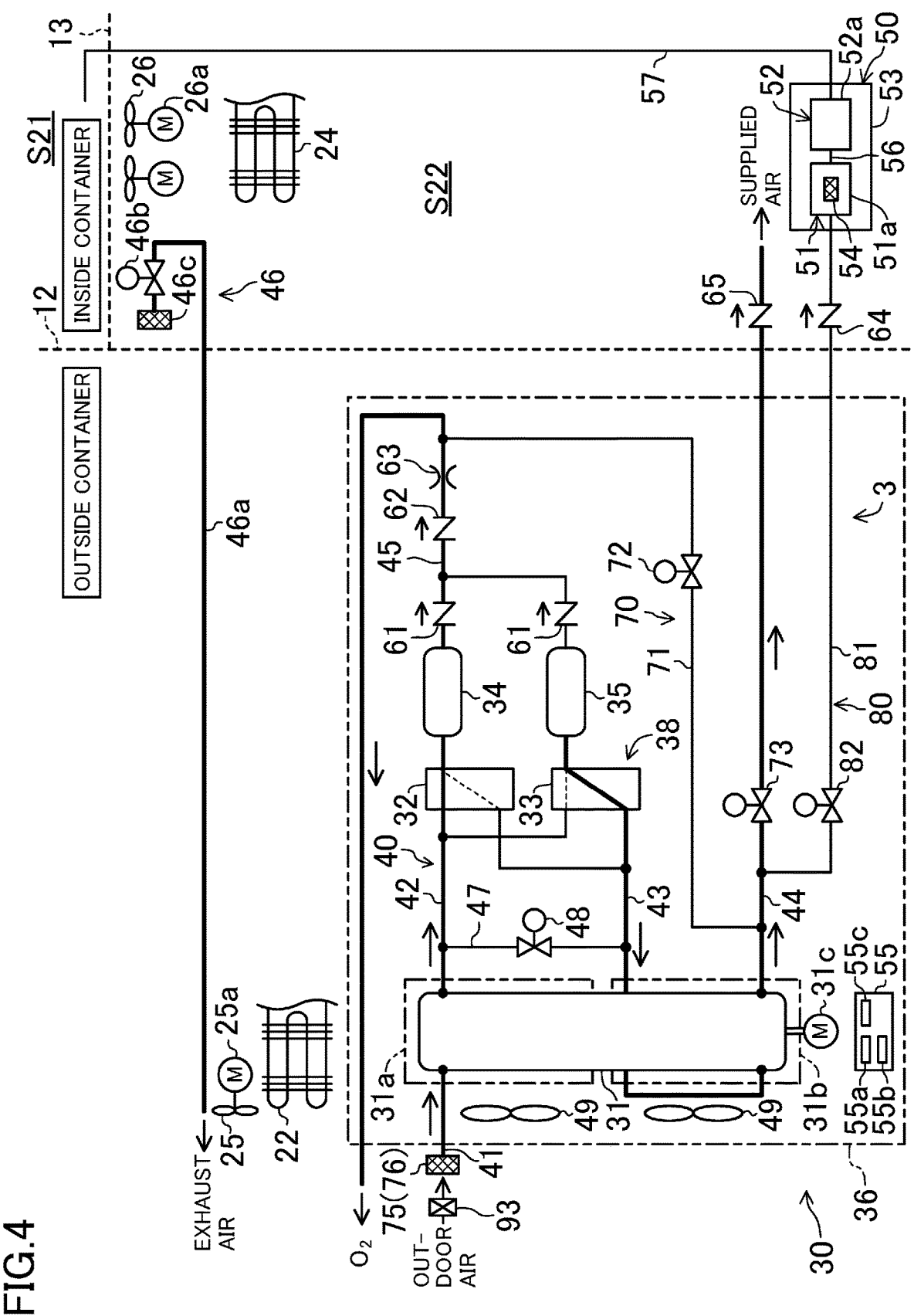
FIG. 4 is a piping system diagram illustrating a configuration of a CA device of the container refrigeration device and an air flow during a first operation.

As illustrated in FIG. 4, the CA device (60) includes the gas supply device (30), an exhaust unit (46), a sensor unit (50), a control unit (55), and a filter unit (75). The CA device (60) adjusts the oxygen concentration and the carbon dioxide concentration of the interior air of the container (11). Note that each "concentration" used in the following description refers to "volume concentration". The control unit (55) includes a microcomputer and a memory device (specifically, a semiconductor memory) that stores software for operating the microcomputer. The control unit (55) controls each component of the CA device (60).

Gas Supply Device

Configuration of Gas Supply Device

The gas supply device (30) sucks air (gas) from the filter unit (75) and supplies nitrogen-enriched air to the interior space (S), i.e., the target space (S), of the container (11).

In the present embodiment, the gas supply device (30) adopts the vacuum pressure swing adsorption (VPSA) technology. As illustrated in FIG. 1, the gas supply device (30) is disposed at a lower left corner of the outer storage space (S1).

As illustrated in FIG. 4, the gas supply device (30) includes an air circuit (3) and a unit case (36) in which the components of the air circuit (3) are stored. An air pump (31), a first direction control valve (32), a second direction control valve (33), a first adsorption cylinder (34), and a second adsorption cylinder (35) are connected to the air circuit (3). An adsorbent for adsorbing nitrogen components in the air is provided in each of the first adsorption cylinder (34) and the second adsorption cylinder (35). As described above, the gas supply device (30) is configured as one unit with the components thereof stored inside the unit case (36), and configured to be attached additionally to the container refrigeration device (10).

Air Pump

The air pump (31) is provided on a gas passage (40) including an outdoor air passage (41), a discharge passage (42), a suction passage (43), and a supply passage (44). The filter unit (75) to be described later is provided at an inlet of the gas passage (40).

The air pump (31) is provided inside the unit case (36) and includes a first pump mechanism (pressurizing unit) (31a) and a second pump mechanism (decompressing unit) (31b) that each suck, pressurize and discharge air. The first pump mechanism (31a) and the second pump mechanism (31b) are connected to a drive shaft of a motor (31c), and driven to rotate by the motor (31c), thereby sucking, pressurizing and discharging air.

One end of the outdoor air passage (41), which penetrates the unit case (36) in and out, is connected to a suction port of the first pump mechanism (31a). The filter unit (75) including an air filter is provided at the other end of the outdoor air passage (41). The outdoor air passage (41) includes a flexible tube. Although not illustrated, the other end of the outdoor air passage (41) provided with the filter unit (75) is provided in the second space (S12) above the condenser (22) in the outer storage space (S1). This configuration allows the first pump mechanism (31a) to suck and pressurize outdoor air from which moisture has been removed when the air has flowed into the unit case (36) from the outside through the filter unit (75) provided at the other end of the outdoor air passage (41). Meanwhile, one end of the discharge passage (42) is connected to a discharge port of the first pump mechanism (31a). The other end of the discharge passage (42) branches into two passages on the downstream side and is connected to each of the first direction control valve (32) and the second direction control valve (33).

One end of the suction passage (43) is connected to a suction port of the second pump mechanism (31b). The other end of the suction passage (43) branches into two passages on the upstream side and is connected to each of the first direction control valve (32) and the second direction control valve (33). Meanwhile, one end of the supply passage (44) is connected to a discharge port of the second pump mechanism (31b). The other end of the supply passage (44) opens in the secondary space (S22) on the blow-out side of the inner fan (26) in the inner storage space (S2) of the container (11). The other end of the supply passage (44) is provided with a check valve (65) that allows air to flow unidirectionally from the one end to the other end of the supply passage (44) and prevents backflow of the air.

In the present embodiment, the discharge passage (42) and the suction passage (43) are connected to each other by a bypass passage (47). The bypass passage (47) is provided with a bypass on-off valve (48) that is opened and closed under the control of the control unit (55).

The first pump mechanism (31a) and the second pump mechanism (31b) of the air pump (31) each include an oilless pump that does not use lubricating oil. Two fans (49) for cooling the air pump (31) by blowing air toward the air pump (31) are provided near one side of the air pump (31).

Mixed Gas Generator

In the present embodiment, the following direction control valves (32, 33) and adsorption cylinders (34, 35) constitute a mixed gas generator (38).

Direction Control Valve

The first direction control valve (32) and the second direction control valve (33) are provided between the air pump (31) and the first and second adsorption cylinders (34, 35) in the air circuit (3). The first direction control valve (32) and the second direction control valve (33) switch the connection state between the air pump (31) and the first and second adsorption cylinders (34, 35) among three (i.e., first to third) connection states to be described later. This switching operation is controlled by the control unit (55).

Specifically, the first direction control valve (32) is connected to: the discharge passage (42) connected to the discharge port of the first pump mechanism (31a); the suction passage (43) connected to the suction port of the second pump mechanism (31b); and one end (inlet during pressurization) of the first adsorption cylinder (34). The first direction control valve (32) is switched between a first state (illustrated in FIG. 4) and a second state (illustrated in FIG. 5). In the first state, the first adsorption cylinder (34) communicates with the discharge port of the first pump mechanism (31a) but is closed off from the suction port of the second pump mechanism (31b). In the second state, the first adsorption cylinder (34) communicates with the suction port of the second pump mechanism (31b) but is closed off from the discharge port of the first pump mechanism (31a).

The second direction control valve (33) is connected to: the discharge passage (42) connected to the discharge port of the first pump mechanism (31a); the suction passage (43) connected to the suction port of the second pump mechanism (31b); and one end of the second adsorption cylinder (35). The second direction control valve (33) is switched between a first state (illustrated in FIG. 4) and a second state (illustrated in FIG. 5). In the first state, the second adsorption cylinder (35) communicates with the suction port of the second pump mechanism (31b) but is closed off from the discharge port of the first pump mechanism (31a). In the second state, the second adsorption cylinder (35) communicates with the discharge port of the first pump mechanism (31a) but is closed off from the suction port of the second pump mechanism (31b).

When the first direction control valve (32) and the second direction control valve (33) are both set to the first state, the air circuit (3) is switched to the first connection state (see FIG. 4) in which the discharge port of the first pump mechanism (31a) and the first adsorption cylinder (34) are connected and the suction port of the second pump mechanism (31b) and the second adsorption cylinder (35) are connected. In this state, the adsorption operation of adsorbing nitrogen components in the outdoor air on the adsorbent is performed in the first adsorption cylinder (34), while the desorption operation of desorbing the nitrogen components adsorbed on the adsorbent is performed in the second adsorption cylinder (35).

When the first direction control valve (32) and the second direction control valve (33) are both set to the second state, the air circuit (3) is switched to the second connection state (see FIG. 5) in which the discharge port of the first pump mechanism (31a) and the second adsorption cylinder (35) are connected and the suction port of the second pump mechanism (31b) and the first adsorption cylinder (34) are connected. In this state, the adsorption operation is performed in the second adsorption cylinder (35) while the desorption operation is performed in the first adsorption cylinder (34).

When the first direction control valve (32) is set to the first state and the second direction control valve (33) is set to the second state, the air circuit (3) is switched to the third connection state (not illustrated) in which the discharge port of the first pump mechanism (31a) is connected to each of the first adsorption cylinder (34) and the second adsorption cylinder (35). In this state, the first adsorption cylinder (34) and the second adsorption cylinder (35) are both connected to the discharge port of the first pump mechanism (31a), and the first pump mechanism (31a) supplies pressurized outdoor air to each of the first adsorption cylinder (34) and the second adsorption cylinder (35). In this state, the adsorption operation is performed in each of the first adsorption cylinder (34) and the second adsorption cylinder (35).

Adsorption Cylinder

The first adsorption cylinder (34) and the second adsorption cylinder (35) each include a cylindrical member filled with an adsorbent. The adsorbent filling each of the first adsorption cylinder (34) and the second adsorption cylinder (35) has a property of adsorbing nitrogen components when pressurized and desorbing the adsorbed nitrogen components when decompressed.

The adsorbent filling each of the first adsorption cylinder (34) and the second adsorption cylinder (35) includes, for example, porous zeolite having pores with a pore diameter smaller than the molecular diameter of nitrogen molecules (3.0 angstroms) but larger than the molecular diameter of oxygen molecules (2.8 angstroms). The adsorbent including zeolite having such a pore diameter can adsorb nitrogen components in the air.

Since an electric field is present and polarity is generated in the pores of the zeolite due to the presence of cations, the zeolite has a property of adsorbing polar molecules such as water molecules. Therefore, not only nitrogen in the air but also moisture (water vapor) in the air is adsorbed on the adsorbent including zeolite and filling each of the first adsorption cylinder (34) and the second adsorption cylinder (35). The moisture adsorbed on the adsorbent is desorbed from the adsorbent together with the nitrogen components in the desorption operation. As a result, nitrogen-enriched air containing the moisture is supplied to the interior space (S) of the container (11), making it possible to increase the humidity of the interior space (S). Furthermore, since the adsorbent is regenerated, the service life of the adsorbent can be extended.

With this configuration, when pressurized outdoor air is supplied from the air pump (31) and the inside of the first adsorption cylinder (34) and the second adsorption cylinder (35) is pressurized, nitrogen components in the outdoor air are adsorbed on the adsorbents. As a result, the nitrogen components are reduced as compared to the outdoor air, whereby oxygen-enriched air having a lower nitrogen concentration and a higher oxygen concentration than the outdoor air is generated. When the air inside the first adsorption cylinder (34) and the second adsorption cylinder (35) is sucked and the inside of the cylinders is decompressed by the air pump (31), on the other hand, the nitrogen components adsorbed on the adsorbents are desorbed. As a result, the nitrogen components are increased as compared to the outdoor air, whereby nitrogen-enriched air having a higher nitrogen concentration and a lower oxygen concentration than the outdoor air is generated. In the present embodiment, nitrogen-enriched air having a component ratio of, for example, 92% nitrogen concentration and 8% oxygen concentration is generated.

One end of an oxygen discharge passage (45) is connected to the other end (outlet during pressurization) of each of the first adsorption cylinder (34) and the second adsorption cylinder (35). The oxygen-enriched air generated in the first adsorption cylinder (34) and the second adsorption cylinder (35) from the outdoor air pressurized and supplied by the first pump mechanism (31a) is guided to the outside of the container (11) through the oxygen discharge passage (45). The one end of the oxygen discharge passage (45) branches into two passages and is connected to the other end of each of the first adsorption cylinder (34) and the second adsorption cylinder (35). The other end of the oxygen discharge passage (45) is open to the outside of the gas supply device (30), that is, outside the container (11). A check valve (61) is provided in each of a portion of the oxygen discharge passage (45) connected to the other end of the first adsorption cylinder (34) and a portion of the oxygen discharge passage (45) connected to the other end of the second adsorption cylinder (35). The check valve (61) prevents backflow of air from the oxygen discharge passage (45) to the first adsorption cylinder (34) or the second adsorption cylinder (35).

A check valve (62) and an orifice (63) are provided in that order from the one end to the other end in a middle part of the oxygen discharge passage (45). The check valve (62) prevents backflow of nitrogen-enriched air from an exhaust connection passage (71), which will be described later, to the first adsorption cylinder (34) and the second adsorption cylinder (35). The orifice (63) decompresses the oxygen-enriched air that has flowed out of the first adsorption cylinder (34) and the second adsorption cylinder (35) before the air is discharged to the outside.

Supply and Discharge Switching Mechanism

The air circuit (3) is provided with a supply and discharge switching mechanism (70). The supply and discharge switching mechanism (70) switches the operation between a gas supply operation to be described later (see FIGS. 4 and 5) of supplying generated nitrogen-enriched air to the interior space (S) of the container (11) and a gas discharge operation (not illustrated) of discharging the generated nitrogen-enriched air to the outside of the container (11). The supply and discharge switching mechanism (70) includes the exhaust connection passage (71), an exhaust on-off valve (72), and a supply-side on-off valve (73).

The exhaust connection passage (71) has one end connected to the supply passage (44) and the other end connected to the oxygen discharge passage (45). The other end of the exhaust connection passage (71) is connected to a portion that is closer to the outside of the container than the orifice (63) of the oxygen discharge passage (45).

The exhaust on-off valve (72) is provided in the exhaust connection passage (71). The exhaust on-off valve (72) is provided in a middle part of the exhaust connection passage (71) and includes an electromagnetic valve. The electromagnetic valve is switched between an open state in which the nitrogen-enriched air flowing from the supply passage (44) is allowed to pass, and a close state in which the flow of the nitrogen-enriched air is blocked. The exhaust on-off valve (72) is opened and closed under the control of the control unit (55).

The supply-side on-off valve (73) is provided closer to the other end side of the supply passage (44) (closer to the interior of the container) than a portion of the supply passage (44) to which the exhaust connection passage (71) is connected. The supply-side on-off valve (73) includes an electromagnetic valve and is provided in the supply passage (44) at a portion closer to the interior of the container than the portion to which the exhaust connection passage (71) is connected. The electromagnetic valve is switched between an open state in which the nitrogen-enriched air is allowed to pass toward the interior of the container, and a close state in which the flow of the nitrogen-enriched air toward the interior of the container is blocked. The supply-side on-off valve (73) is opened and closed under the control of the control unit (55).

Measurement Unit

The air circuit (3) is provided with a measurement unit (80). The measurement unit (80) performs a supplied air measurement operation (not illustrated) of measuring the concentration of the generated nitrogen-enriched air using an oxygen sensor (51) of the sensor unit (50) to be described later that is provided in the interior space (S) of the container (11). The measurement unit (80) includes a branch pipe (measurement passage) (81) and a measurement on-off valve (82), and is configured to branch part of the nitrogen-enriched air flowing through the supply passage (44) and guide the air to the oxygen sensor (51).

Specifically, the branch pipe (81) has one end connected to the supply passage (44) and the other end coupled to an oxygen sensor box (51a), to be described later, of the oxygen sensor (51). In the present embodiment, the branch pipe (81) branches from the supply passage (44) inside the unit case (36) and extends to the outside of the unit case.

The measurement on-off valve (82) is provided in the branch pipe (81) inside the unit case. The measurement on-off valve (82) includes an electromagnetic valve. The electromagnetic valve is switched between an open state in which the nitrogen-enriched air is allowed to pass through the branch pipe (81), and a close state in which the flow of the nitrogen-enriched air through the branch pipe (81) is blocked. The measurement on-off valve (82) is opened and closed under the control of the control unit (55). The measurement on-off valve (82) is opened only when the supplied air measurement operation to be described later is performed, and closed in other modes, although the details thereof will be described later.

Exhaust Unit

Configuration of Exhaust Unit

As illustrated in FIG. 2, the exhaust unit (46) includes an exhaust passage (46a) that connects the inner storage space (S2) and the space outside the container, an exhaust valve (46b) connected to the exhaust passage (46a), and a membrane filter (46c) provided at an inflow end (end inside the container) of the exhaust passage (46a). The exhaust passage (46a) penetrates the casing (12) in and out. The exhaust valve (46b) is provided in the exhaust passage (46a) inside the container and includes an electromagnetic valve. The electromagnetic valve is switched between an open state in which air is allowed to pass through the exhaust passage (46a), and a close state in which the flow of the air through the exhaust passage (46a) is blocked. The exhaust valve (46b) is opened and closed under the control of the control unit (55).

Operation of Exhaust Unit

When the control unit (55) opens the exhaust valve (46b) during rotation of the inner fan (26), an exhaust operation is performed in which the air (interior air) in the inner storage space (S2) connected to the interior space (S) is discharged to the outside of the container.

Specifically, when the inner fan (26) rotates, the pressure in the secondary space (S22) on the blow-out side becomes higher than the pressure in the space outside the container (atmospheric pressure). Therefore, when the exhaust valve (46b) is open, the pressure difference generated between both ends of the exhaust passage (46a) (pressure difference between the space outside the container and the secondary space (S22)) causes the air in the inner storage space (S2) connected to the interior space (S) (interior air) to be discharged to the space outside the container through the exhaust passage (46a).

Sensor Unit

Configuration of Sensor Unit

As illustrated in FIG. 2, the sensor unit (50) is provided in the secondary space (S22) on the blow-out side of the inner fan (26) in the inner storage space (S2). The sensor unit (50) includes an oxygen sensor (51), a carbon dioxide sensor (52), a fixed plate (53), a membrane filter (54), a connecting pipe (56), and an exhaust pipe (57).

The oxygen sensor (51) includes the oxygen sensor box (51*a*) in which a galvanic cell type sensor is accommodated. The oxygen sensor (51) measures the oxygen concentration in the gas in the oxygen sensor box (51*a*) by measuring the value of current flowing through electrolyte of the galvanic cell type sensor. An outer surface of the oxygen sensor box (51*a*) is fixed to the fixed plate (53). An opening is formed in an outer surface of the oxygen sensor box (51*a*) opposite to the surface fixed to the fixed plate (53), and the membrane filter (54) having air permeability and waterproofness is attached in the opening. One end of the connecting pipe (56) is coupled to one side surface of the oxygen sensor box (51*a*) via a connector. Furthermore, the branch pipe (81) of the measurement unit (80) is coupled to the lower surface of the oxygen sensor box (51*a*) via a connector (pipe joint).

The carbon dioxide sensor (52) includes a carbon dioxide sensor box (52*a*). The carbon dioxide sensor (52) is a non dispersive infrared (NDIR) sensor that measures the carbon dioxide concentration in the gas by emitting infrared rays to the gas in the carbon dioxide sensor box (52*a*) and measuring the absorption amount of infrared rays having a wavelength specific to carbon dioxide. The other end of the connecting pipe (56) is coupled to one side surface of the carbon dioxide sensor box (52*a*) via a connector. One end of the exhaust pipe (57) is coupled to the other side surface of the carbon dioxide sensor box (52*a*) via a connector.

The fixed plate (53) is fixed to the casing (12) with the oxygen sensor (51) and the carbon dioxide sensor (52) attached to the fixed plate (53).

As described above, the connecting pipe (56) is coupled to the side surface of the oxygen sensor box (51*a*) and the side surface of the carbon dioxide sensor box (52*a*), and allows the internal space of the oxygen sensor box (51*a*) to communicate with the internal space of the carbon dioxide sensor box (52*a*).

As described above, the exhaust pipe (57) has one end coupled to the other side surface of the carbon dioxide sensor box (52*a*) and the other end opened near the suction port of the inner fan (26). That is, the exhaust pipe (57) allows the internal space of the carbon dioxide sensor box (52*a*) to communicate with the primary space (S21) of the inner storage space (S2).

Concentration Measurement Operation

The secondary space (S22) and the primary space (S21) of the inner storage space (S2) communicate with each other through an air passage (58) formed by the membrane filter (54), the internal space of the oxygen sensor box (51*a*), the connecting pipe (56), the internal space of the carbon dioxide sensor box (52*a*), and the exhaust pipe (57). During operation of the inner fan (26), therefore, the pressure in the primary space (S21) is lower than the pressure in the secondary space (S22). This pressure difference allows the interior air to flow from the secondary space (S22) toward the primary space (S21) through the air passage (58) to which the oxygen sensor (51) and the carbon dioxide sensor (52) are connected. In this way, the interior air passes through the oxygen sensor (51) and the carbon dioxide sensor (52) in that order; in the meantime, the oxygen sensor (51) measures the oxygen concentration of the interior air and the carbon dioxide sensor (52) measures the carbon dioxide concentration of the interior air.

Control Unit

The control unit (55) is configured to execute a concentration adjustment operation of setting the oxygen concentration and the carbon dioxide concentration of the interior air of the container (11) to desired concentrations. Specifically, the control unit (55) controls, based on the measurement results of the oxygen sensor (51) and the carbon dioxide sensor (52), the operation of the gas supply device (30) and the exhaust unit (46) such that the compositions (oxygen concentration and carbon dioxide concentration) of the interior air of the container (11) become desired compositions (for example, oxygen concentration: 3%, carbon dioxide concentration: 5%).

Filter Unit

Figure 6:
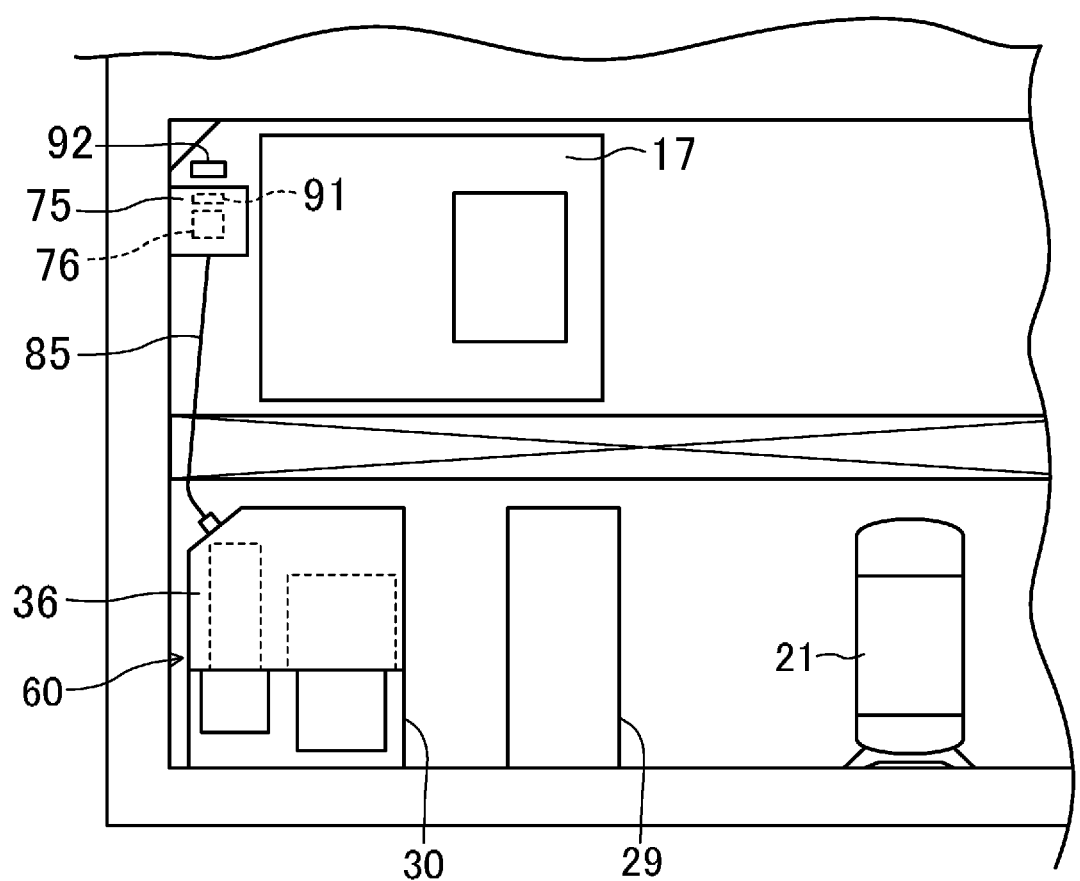
FIG. 6 is an enlarged perspective view of a main part of the container refrigeration device.

As illustrated in FIGS. 1 and 6, the gas supply device (30) is disposed at the lower left corner of the outer storage space (S1) (left end below the condenser (22)), while the filter unit (75) provided for taking air into the gas supply device (30) is disposed on the left side of the electric component box (17) when the outer storage space (S1) is viewed from the front. Specifically, the filter unit (75) is disposed on the left inner surface of the casing (11) in the outer storage space (S1). One end of an air tube (85), which constitutes the outdoor air passage (41) for sucking air, is connected to the air pump (31) in the unit case (36), and the filter unit (75) is connected to the other end of the air tube (85). In the filter unit, a plurality of (three or four) surfaces of a hollow filter box other than the surface to which the air tube is connected includes air suction ports for sucking air, and an air filter (76) is attached to each of the air suction ports. The air filter (76) includes a membrane filter having air permeability and waterproofness.

Suppression of Pressure Loss of Filter

The gas supply device (30) of the present embodiment includes a heating unit (93) (see FIGS. 4 and 5) that heats gas flowing into the filter (76) provided in the filter unit (75). The gas supply device (30) also includes a salt amount detection unit (91) (see FIG. 6) that detects the amount of salt adhering to the air filter (76), and a humidity detection unit (92) that detects the humidity of gas flowing into the gas passage (40) through the inlet.

The control unit (55) includes a pressure loss comparison unit (55*b*) and a heating control unit (55*c*). The pressure loss comparison unit (55*b*) compares an actual pressure loss value with the pressure loss reference value when the humidity detection value detected by the humidity detection unit exceeds a deliquescence reference humidity. The heating control unit (55*c*) causes the heating unit (93) to heat the gas flowing into the air filter (76) in a case where the amount of salt detected by the salt amount detection unit (91) is equal to or higher than a reference salt amount and the relative humidity of the gas detected by the humidity detection unit (92) is equal to or higher than a humidity reference value.

The control unit (55) also includes a pressure loss prediction unit (55*a*) that predicts the pressure loss of the filter when a deliquescence phenomenon occurs, based on the amount of salt detected by the salt amount detection unit (91) and the humidity of the gas detected by the humidity detection unit (92). The pressure loss comparison unit (55*b*) is also configured to be able to compare a predicted pressure loss value of the pressure loss prediction unit (55*a*) with a predetermined pressure loss reference value when the humidity detected by the humidity detection unit (92) is smaller than the deliquescence reference humidity, in addition to comparing the actual pressure loss value with the pressure loss reference value.

Figure 9:
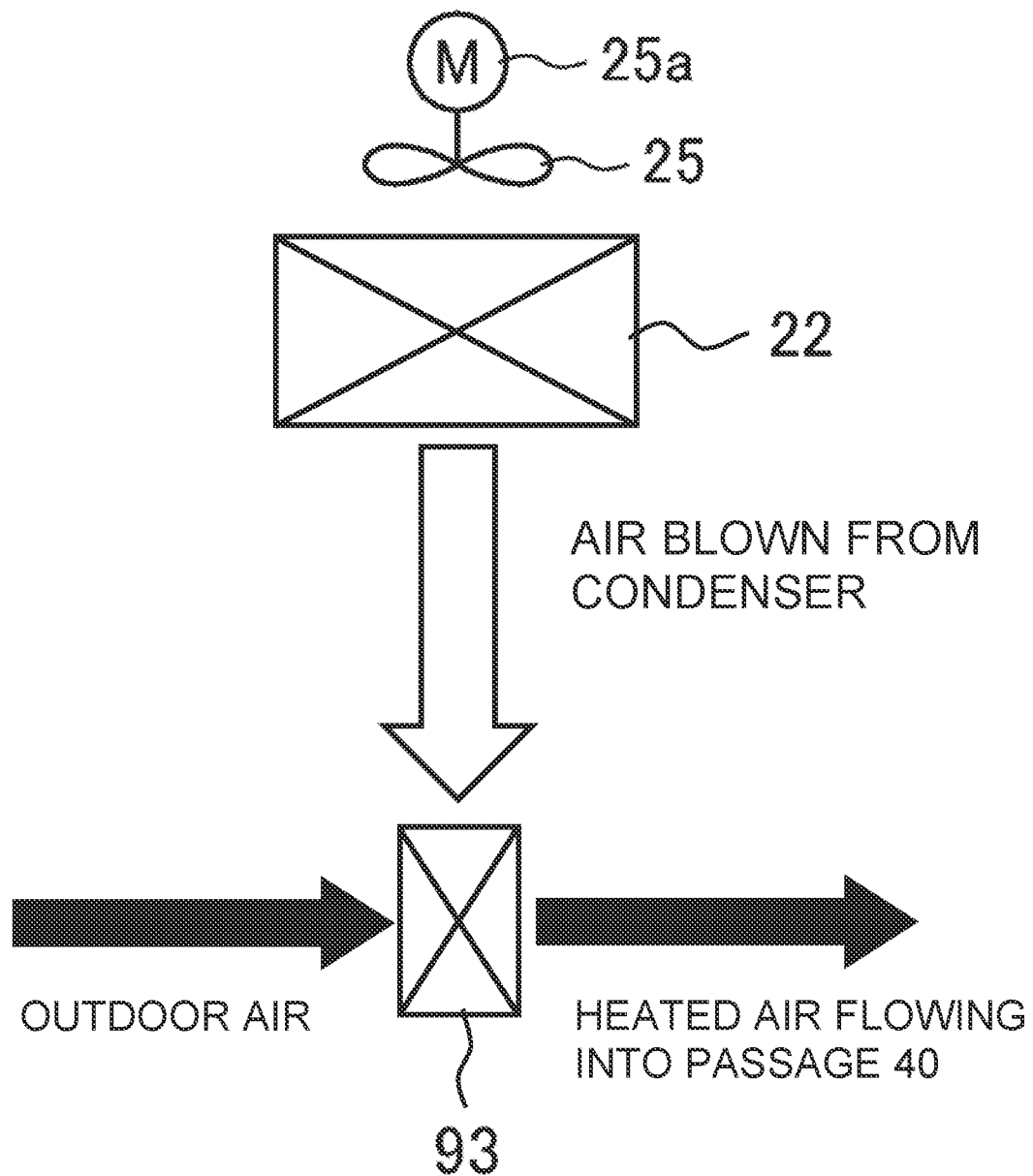
FIG. 9 is a diagram illustrating an example configuration whereby air that has passed through a condenser is used to heat gas flowing into a gas supply device.

The heating unit (93) is configured to heat, under the control of the heating control unit (55c), the gas flowing into the gas passage (40) using the air that has passed through the condenser (22) provided in the refrigerant circuit (20). A configuration whereby the heating unit (93) heats the gas (outdoor air) flowing into the gas passage (40) using the air that has passed through the condenser (22) is shown in FIG. 9.

If an atmospheric corrosion monitor (ACM) sensor is used as the salt amount detection unit (91), the amount of salt can be directly measured by that sensor. The humidity detection unit (92) is disposed near the filter unit (75) in order to measure the humidity of the air around the air filter (76).

In the present embodiment, the gas flowing into the air filter (76) is heated when the salt attached to the air filter (76) affects the pressure loss due to the occurrence of the deliquescence phenomenon. It is only necessary to exercise control based on the actual amount of salt and the actual humidity. That is, in the present embodiment, it is not absolutely necessary to exercise control based on a predicted value using the pressure loss prediction unit (55a). It is only necessary to exercise control based at least on an actual value.

Increase in Pressure Loss and Heating of Gas

If the humidity of the outdoor air exceeds 75%, the deliquescence phenomenon usually occurs at the air filter (76). In the present embodiment, therefore, control is exercised for causing the heating unit (93) to heat the gas flowing into the air filter (76) in accordance with the amount of salt in the air filter (76) and the humidity of the outdoor air. Specifically, the heating unit (93) heats the gas flowing into the air filter (76) in a case where the amount of salt detected by the salt amount detection unit (91) is equal to or higher than the reference salt amount and the relative humidity of the gas detected by the humidity detection unit (92) is equal to or higher than the humidity reference value (75%).

Figure 7:
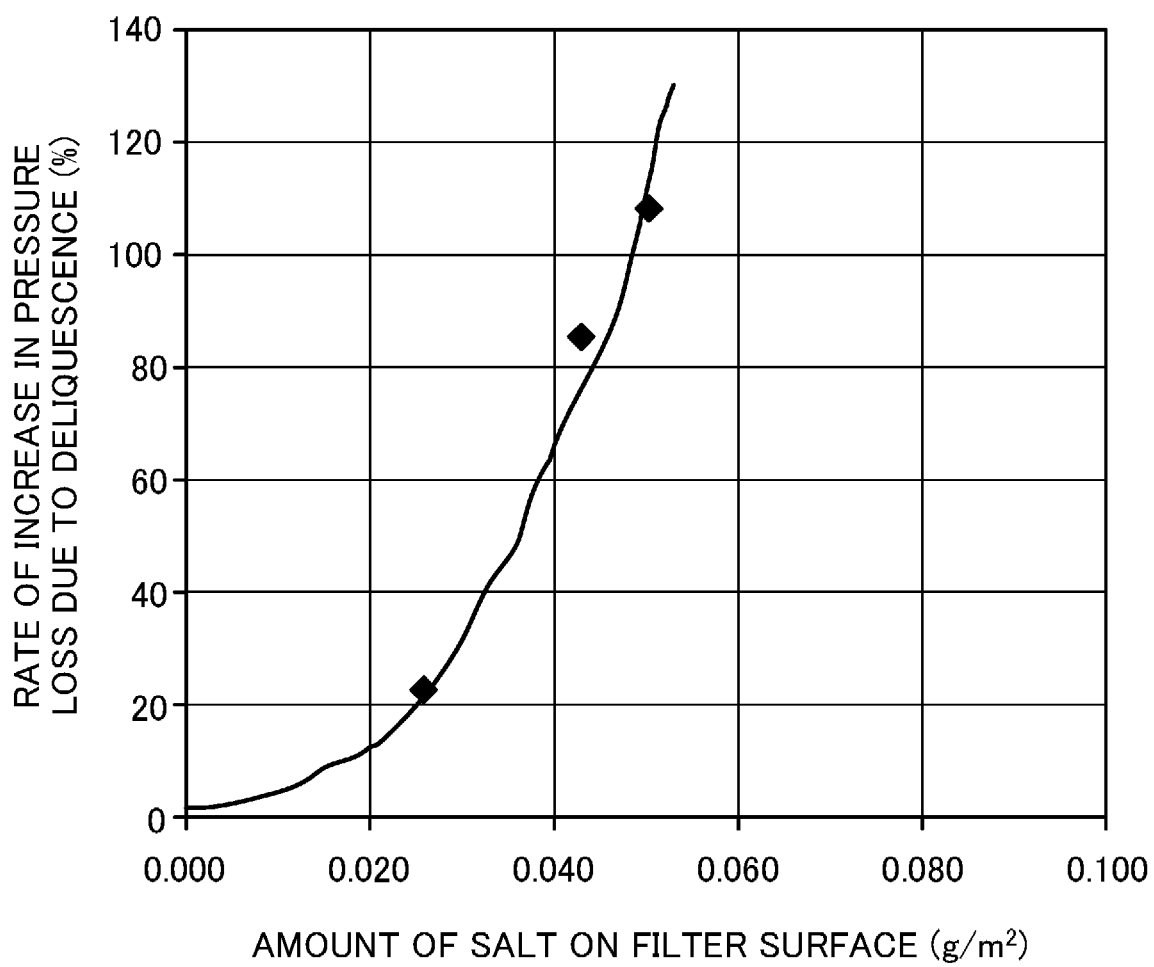
FIG. 7 is a graph illustrating, based on past data, the relationship between the amount of salt on a filter surface and the rate of increase in pressure loss when a deliquescence phenomenon occurs at the corresponding amount of salt.
Figure 8:
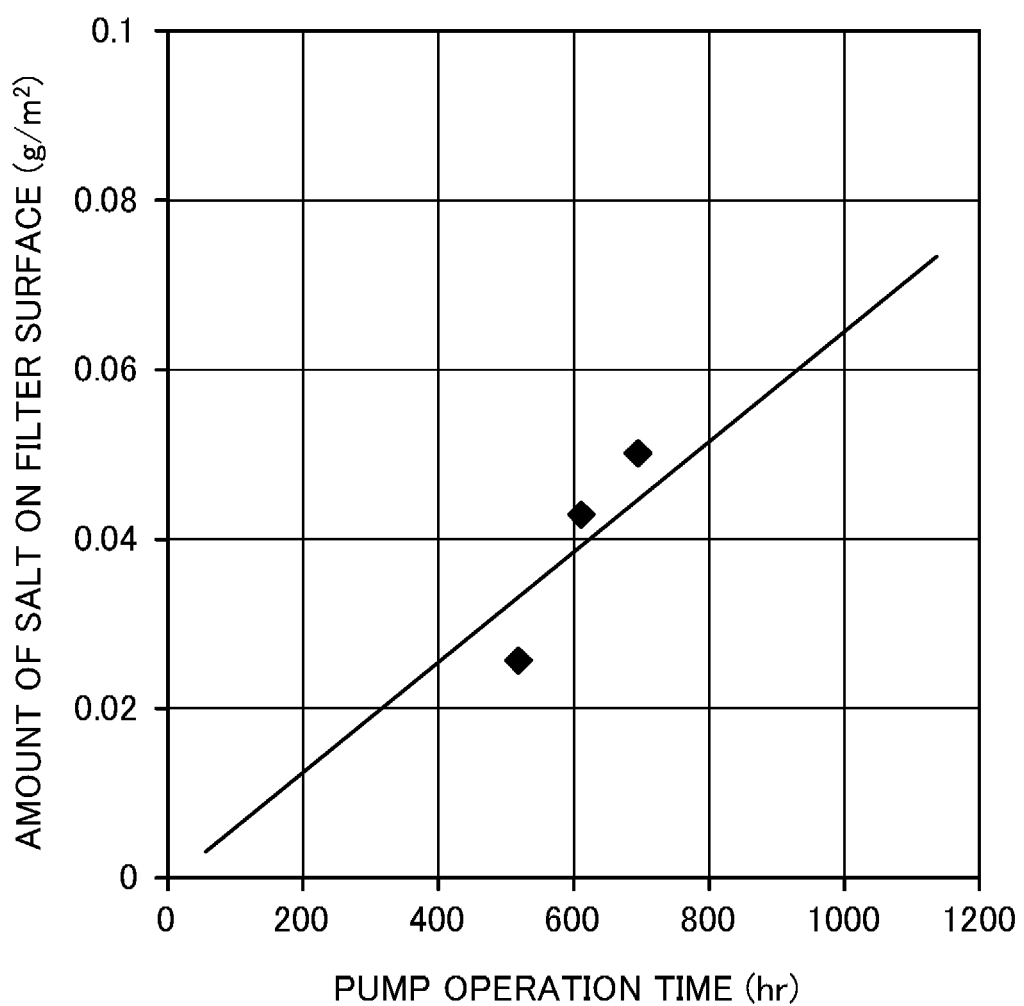
FIG. 8 is a graph illustrating, based on past data, the relationship between pump operation time and the amount of salt on the filter surface.

The above control is an example of control exercised based on an actual value of the pressure loss, and control based on a predicted value is exercised as follows. First, FIG. 7 is a graph illustrating, based on past data, the relationship between the amount of salt on a filter surface and the rate of increase in pressure loss when a deliquescence phenomenon occurs at the corresponding amount of salt, and FIG. 8 is a graph illustrating, based on past data, the relationship between pump operation time and the amount of salt on the filter surface. Here, as described above, the deliquescence phenomenon generally occurs when the relative humidity reaches about 75%. The pressure loss increases as the humidity rises.

The pressure loss prediction unit (55a) measures the suction pressure of the air pump (31) using a pressure sensor (not illustrated) provided in the gas passage (40). In a case where the humidity of the outdoor air at the time of the measurement is, for example, 75% or less, the pressure loss prediction unit (55a) predicts the rate of increase in pressure loss when the deliquescence phenomenon occurs at a high humidity (e.g. 90%) from past data based on the graph in FIG. 7, and then predicts whether the pressure loss exceeds a predetermined threshold (pressure loss reference value) during operation. When the predicted pressure loss value exceeds the pressure loss reference value, the heating control unit (55c) causes the heating unit (93) to heat the gas (outdoor air) flowing into the air filter (76).

Here, as illustrated in FIG. 8, the amount of salt on the filter surface increases as the operation time is extended. As illustrated in FIG. 7, as the amount of salt on the filter surface increases, the pressure loss when the deliquescence phenomenon occurs increases. For example, in FIG. 7, when the amount of salt exceeds 0.05 g/m$^2$, the pressure loss is substantially doubled (about 100% increase). In the present embodiment, therefore, the gas (outdoor air) flowing into the air filter (76) is heated at the suction pressure of −24.5 KPa, although the gas is usually heated when the suction pressure reaches −49 KPa at a normal humidity. This makes it possible to avoid in advance a phenomenon in which the pressure loss increases due to the deliquescence that occurs at the air filter (76) at a high humidity. Note that the above value of the suction pressure is merely an example.

Operation

Operation of Refrigerant Circuit

In the present embodiment, a unit controller (100) illustrated in FIG. 3 performs a cooling operation for cooling the interior air of the container (11).

During the cooling operation, the unit controller (100) controls the operations of the compressor (21), the expansion valve (23), the outer fan (25), and the inner fan (26) based on the measurement result of a temperature sensor (not illustrated), such that the temperature of the interior air reaches a desired target temperature. At this time, refrigerant circulates and a vapor compression refrigeration cycle is performed in the refrigerant circuit (20). Then, the interior air of the container (11) that has been guided to the inner storage space (S2) by the inner fan (26) is cooled by the refrigerant flowing through the evaporator (24) when the air passes through the evaporator (24). The interior air that has been cooled in the evaporator (24) passes through the underfloor channel (19a) and is blown out again into the interior space (S) of the container (11) through the blow-out port (18b). As a result, the interior air of the container (11) is cooled.

Basic Operation of Gas Supply Device

In the gas supply device (30), a first operation (see FIG. 4) and a second operation (see FIG. 5) are repeated alternately at predetermined time intervals (for example, 14.5 seconds), whereby nitrogen-enriched air and oxygen-enriched air are generated. In the first operation, the first adsorption cylinder (34) is pressurized and at the same time the second adsorption cylinder (35) is decompressed, whereas in the second operation, the first adsorption cylinder (34) is decompressed and at the same time the second adsorption cylinder (35) is pressurized. In the present embodiment, a pressure equalizing operation (not illustrated), in which both the first adsorption cylinder (34) and the second adsorption cylinder (35) are pressurized, is performed for a predetermined time (for example, 1.5 seconds) between the first operation and the second operation. The operation is switched by the control unit (55) operating the first direction control valve (32) and the second direction control valve (33).

First Operation

In the first operation, the control unit (55) switches both the first direction control valve (32) and the second direction control valve (33) to the first state illustrated in FIG. 4. The air circuit (3) is thus switched to the first connection state in which the first adsorption cylinder (34) communicates with the discharge port of the first pump mechanism (31a) but is closed off from the suction port of the second pump mechanism (31b), while the second adsorption cylinder (35) communicates with the suction port of the second pump mechanism (31b) but is closed off from the discharge port of the first pump mechanism (31a).

The first pump mechanism (31a) supplies pressurized outdoor air to the first adsorption cylinder (34). Nitrogen components contained in the air flowing into the first adsorption cylinder (34) are adsorbed on the adsorbent in the first adsorption cylinder (34). As described above, during the first operation, the pressurized outdoor air is supplied from the first pump mechanism (31a) to the first adsorption cylinder (34) and the nitrogen components in the outdoor air are adsorbed on the adsorbent in the first adsorption cylinder (34). As a result, oxygen-enriched air having a lower nitrogen concentration and a higher oxygen concentration than the outdoor air is generated. The oxygen-enriched air flows from the first adsorption cylinder (34) to the oxygen discharge passage (45).

Meanwhile, the second pump mechanism (31b) sucks air from the second adsorption cylinder (35). At that time, the nitrogen components adsorbed on the adsorbent in the second adsorption cylinder (35) are sucked together with the air by the second pump mechanism (31b) and desorbed from the adsorbent. As described above, during the first operation, the air is sucked from the second adsorption cylinder (35) by the second pump mechanism (31b) and the nitrogen components adsorbed on the adsorbent are desorbed. As a result, nitrogen-enriched air containing the nitrogen components desorbed from the adsorbent and having a higher nitrogen concentration and a lower oxygen concentration than the outdoor air is generated. The nitrogen-enriched air is sucked into the second pump mechanism (31b), pressurized, and then discharged to the supply passage (44).

Second Operation

Figure 5:
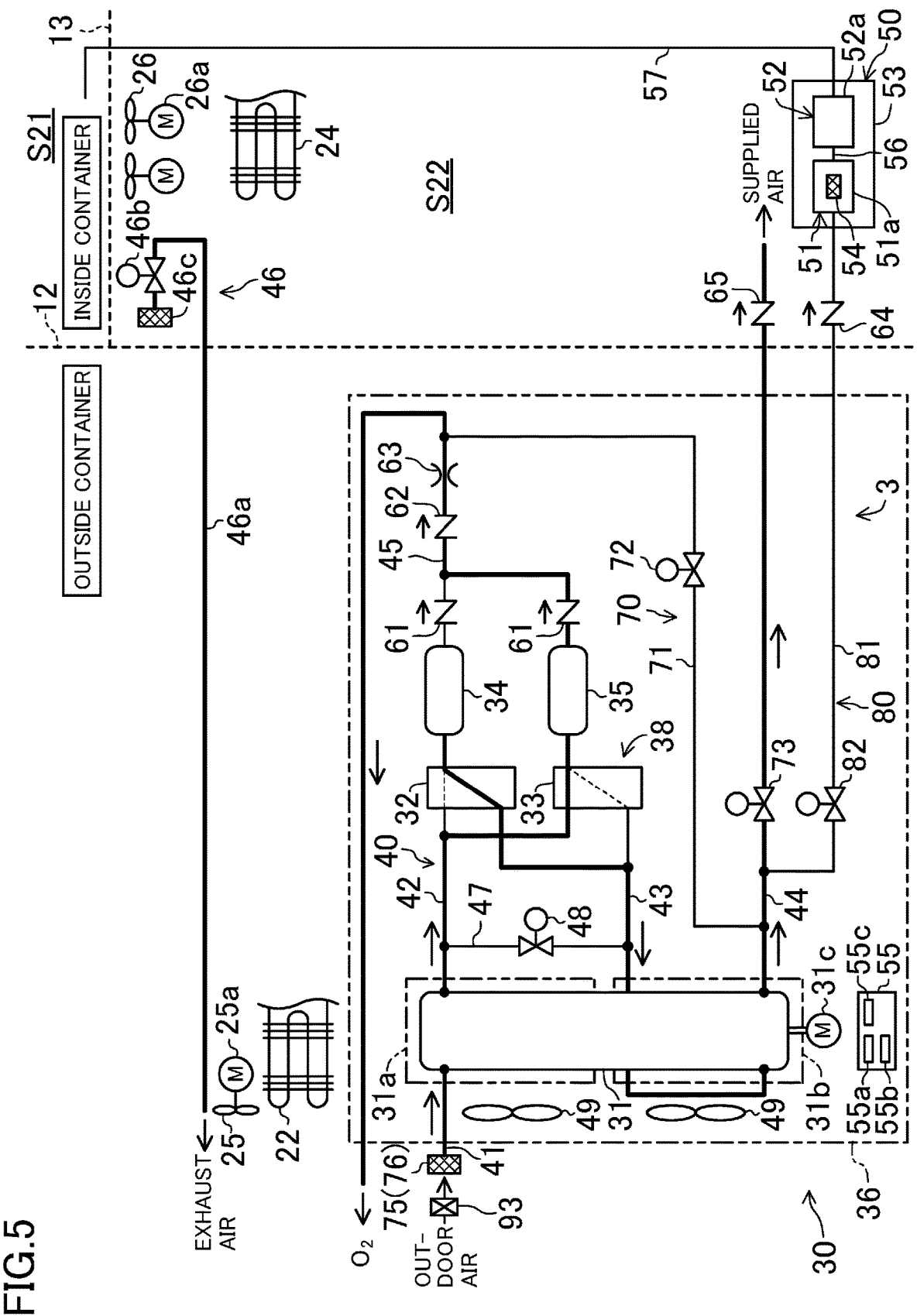
FIG. 5 is a piping system diagram illustrating the configuration of the CA device of the container refrigeration device and an air flow during a second operation.

In the second operation, the control unit (55) switches both the first direction control valve (32) and the second direction control valve (33) to the second state illustrated in FIG. 5. The air circuit (3) is thus switched to the second connection state in which the first adsorption cylinder (34) communicates with the suction port of the second pump mechanism (31b) but is closed off from the discharge port of the first pump mechanism (31a), while the second adsorption cylinder (35) communicates with the discharge port of the first pump mechanism (31a) but is closed off from the suction port of the second pump mechanism (31b).

The first pump mechanism (31a) supplies pressurized outdoor air to the second adsorption cylinder (35). Nitrogen components contained in the air flowing into the second adsorption cylinder (35) are adsorbed on the adsorbent in the second adsorption cylinder (35). As described above, during the second operation, the pressurized outdoor air is supplied from the first pump mechanism (31a) to the second adsorption cylinder (35) and the nitrogen components in the outdoor air are adsorbed on the adsorbent in the second adsorption cylinder (35). As a result, oxygen-enriched air having a lower nitrogen concentration and a higher oxygen concentration than the outdoor air is generated. The oxygen-enriched air flows from the second adsorption cylinder (35) to the oxygen discharge passage (45).

Meanwhile, the second pump mechanism (31b) sucks air from the first adsorption cylinder (34). At that time, the nitrogen components adsorbed on the adsorbent in the first adsorption cylinder (34) are sucked together with the air by the second pump mechanism (31b) and desorbed from the adsorbent. As described above, during the second operation, the air is sucked from the first adsorption cylinder (34) by the second pump mechanism (31b) and the nitrogen components adsorbed on the adsorbent are desorbed. As a result, nitrogen-enriched air containing the nitrogen components desorbed from the adsorbent and having a higher nitrogen concentration and a lower oxygen concentration than the outdoor air is generated. The nitrogen-enriched air is sucked into the second pump mechanism (31b), pressurized, and then discharged to the supply passage (44).

Note that as described above, during the first operation, the air is pressurized and the adsorption operation is performed by the first pump mechanism (31a) in the first adsorption cylinder (34), while the air is decompressed and the desorption operation is performed by the second pump mechanism (31b) in the second adsorption cylinder (35). Meanwhile, during the second operation, the air is pressurized and the adsorption operation is performed by the first pump mechanism (31a) in the second adsorption cylinder (35), while the air is decompressed and the desorption operation is performed by the second pump mechanism (31b) in the first adsorption cylinder (34). Therefore, if the first operation is switched to the second operation or the second operation is switched to the first operation without the above-described pressure equalizing operation interposed therebetween, the pressure is extremely low, immediately after the switching, in the adsorption cylinder in which the desorption operation has been performed before the switching. Thus, it takes time for the pressure in that adsorption cylinder to rise, and the adsorption operation is not performed immediately.

To address this issue, in the present embodiment, when the first operation is switched to the second operation and when the second operation is switched to the first operation, the air circuit (3) is switched to the third connection state and the first adsorption cylinder (34) and the second adsorption cylinder (35) communicate with each other via the first direction control valve (32) and the second direction control valve (33). As a result, the internal pressures of the first adsorption cylinder (34) and the second adsorption cylinder (35) quickly become equal to each other (become a pressure intermediate between the internal pressures). Such a pressure equalizing operation quickly raises the pressure in the adsorption cylinder in which the air has been decompressed and the desorption operation has been performed by the second pump mechanism (31b) before the switching. As a result, the adsorption operation is performed quickly after the adsorption cylinder is connected to the first pump mechanism (31a).

In this way, in the gas supply device (30), the nitrogen-enriched air and the oxygen-enriched air are generated in the air circuit (3) by the first operation and the second operation being alternately repeated with the pressure equalizing operation interposed therebetween.

Effect of Embodiment

According to the present embodiment, the gas flowing into the filter (76) is heated by the heating unit (93) in the case where the amount of salt detected by the salt amount detection unit (91) is equal to or higher than the reference salt amount and the relative humidity of the gas detected by the humidity detection unit (92) is equal to or higher than the humidity reference value. Therefore, under the condition where the humidity is high and deliquescence is likely to occur, moisture is released from the filter (76), and the occurrence of the deliquescence phenomenon is suppressed. That is, according to the present embodiment, it is possible to prevent the difficulty of air passing through the filter (76) during operation.

According to the above embodiment, the gas flowing into the filter (76) is heated by the condenser (22) of the refrigerant circuit (20), making it possible to prevent, with a simple configuration, the difficulty of the gas passing through the filter (76) during operation.

Other Embodiments

The above embodiment may have the following configurations.

For example, in the above embodiment, the gas supply device (30) sucks air from the filter unit (75) and supplies nitrogen-enriched air to the interior space (S), i.e. the target space (S), of the container (11). Alternatively, the target space (S) need not be the interior space (S) of the container (11), and the gas to be supplied need not be the nitrogen-enriched air. For example, the gas supply device (30) may supply gas into a warehouse in a coastal area.

In the above embodiment, the ACM sensor is used as the salt amount detection unit (91). Alternatively, the amount of adhering salt may be determined based on the graph of FIG. 8, or the amount of salt may be determined based on a conversion formula between the pump operation time and the amount of adhering salt (which is effective when the ship course is almost the same).

For example, a sensor provided inside the container (11) may be used as the humidity detection unit, instead of the humidity sensor provided in the filter atmosphere. Specifically, for example, when the interior air adjustment device (60) fills the interior of the container with outdoor air, the air may be introduced into the humidity sensor in the interior air adjustment device (60) to measure the humidity outside the container, or a ventilation opening of the container (11) may be opened to take in the air outside the container, and the humidity may be measured at that time.

For example, the heating unit (93) may constantly heat the gas flowing into the filter (76). Even in this case, since the gas flowing into the filter (76) is heated by the heating unit (93), the occurrence of the deliquescence phenomenon is suppressed. If the gas flowing into the filter (76) is constantly heated by the heating unit (93), low-humidity air is supplied to the filter (76). As a result, it is possible to suppress adherence of moisture to the filter (76), and to suppress the difficulty of gas passing through the filter (76).

INDUSTRIAL APPLICABILITY

As described above, the present disclosure is useful for: a gas supply device including a gas passage through which gas is supplied to a target space, a filter unit provided at an inlet of the gas passage, and an air pump provided on the gas passage; an interior air adjustment device that supplies, to the target space, mixed gas having a low oxygen content and a high nitrogen content; and a container refrigeration device including the interior air adjustment device.

REFERENCE SIGNS LIST

10 Container refrigeration device
11 Container
12 Casing
20 Refrigerant circuit
22 Condenser
30 Gas supply device
31 Air pump
38 Mixed gas generator
40 Gas passage
60 Interior air adjustment device
75 Filter unit
76 Filter (air filter)
91 Salt amount detection unit
92 Humidity detection unit
93 Heating unit

The invention claimed is:

1. A gas supply device comprising:
a gas passage through which gas is supplied to a target space;
a filter provided at an inlet of the gas passage; and
an air pump provided on the gas passage; and
a controller,
wherein the target space is an interior space of a container used for maritime transport, or an interior space of a warehouse in a coastal area,
the gas passage is a passage through which outdoor air is supplied to the target space, and
the controller is programmed to cause air blown from a condenser to be used to heat the gas flowing into the filter in response to determining that an amount of salt adhering to the filter is equal to or higher than a reference salt amount.

2. The gas supply device according to claim 1,
wherein the controller is programmed to heat the gas flowing into the filter in response to both determining that the amount of salt is equal to or higher than a reference salt amount and that a relative humidity of the gas is equal to or higher than a humidity reference value.

3. A gas supply device comprising:
a gas passage through which gas is supplied to a target space;
a filter provided at an inlet of the gas passage;
an air pump provided on the gas passage;
a controller; and
an atmospheric corrosion monitor (ACM) sensor that detects an amount of salt adhering to the filter provided in the filter unit,
wherein the controller is programmed to cause air blown from a condenser to be used to heat the gas flowing into the filter in response to determining that the amount of salt detected by the ACM sensor is equal to or higher than a reference salt amount.

4. The gas supply device according to claim 3,
wherein the controller is programmed to heat the gas flowing into the filter in response to both determining that the amount of salt detected by the ACM sensor salt amount detection unit is equal to or higher than a reference salt amount and that a relative humidity of the gas is equal to or higher than a humidity reference value.

5. An interior air adjustment device comprising:
a gas supply device; and
a mixed gas generator that generates, from air taken in through a filter unit of the gas supply device, mixed gas having a higher nitrogen concentration and a lower oxygen concentration than the air, wherein the gas supply device includes:
- a gas passage through which gas is supplied to a target space;
- the filter provided at an inlet of the gas passage;
- an air pump provided on the gas passage; and
- a controller, the controller is programmed to cause air blown from a condenser to be used to heat the gas flowing into the filter in response to determining that an amount of salt adhering to the filter is equal to or higher than a reference salt amount, and the interior air adjustment device is configured to supply the gas generated by the mixed gas generator to the target space using the air pump.

6. A container refrigeration device comprising:
- a casing mounted on a container;
- a component of a refrigerant circuit attached to the casing; and
- an interior air adjustment device attached to the casing, the container refrigeration device being configured to cool an interior space of the container and to supply mixed gas to the interior space of the container by the interior air adjustment device, wherein the interior air adjustment device is the interior air adjustment device according to claim 5.

7. The container refrigeration device according to claim 6, wherein the condenser is provided in the refrigerant circuit.

8. The interior air adjustment device according to claim 5, wherein the controller is programmed to heat the gas flowing into the filter in response to both determining that the amount of salt is equal to or higher than a reference salt amount and that a relative humidity of the gas is equal to or higher than a humidity reference value.

\* \* \* \* \*